(12) United States Patent
Yochai (10) Patent No.: US 8,255,637 B2
(45) Date of Patent: Aug. 28, 2012

(54) MASS STORAGE SYSTEM AND METHOD OF OPERATING USING CONSISTENCY CHECKPOINTS AND DESTAGING

(75) Inventor: Yechiel Yochai, Menashe (IL)

(73) Assignee: Infinidat Ltd., Herzliya (IL)

( * ) Notice: Subject to any disclaimer, the term of this patent is extended or adjusted under 35 U.S.C. 154(b) by 155 days.

(21) Appl. No.: 12/891,049

(22) Filed: Sep. 27, 2010

(65) Prior Publication Data

US 2012/0079207 A1    Mar. 29, 2012

(51) Int. Cl.
   *G06F 12/00* (2006.01)
(52) U.S. Cl. ........ 711/141; 711/133; 711/156; 711/136; 711/160; 707/649; 714/2; 714/6.2; 714/6.21; 714/6.22; 714/6.23
(58) Field of Classification Search .................. 711/141, 711/133, 136, 156, 160; 707/649; 714/2, 714/6.2, 6.21, 6.22, 6.23
   See application file for complete search history.

(56) References Cited

U.S. PATENT DOCUMENTS

| | | | |
|---|---|---|---|
| 5,341,493 A | 8/1994 | Yanai et al. | |
| 6,052,799 A * | 4/2000 | Li et al. | 714/13 |
| 6,691,245 B1 | 2/2004 | DeKoning | |
| 7,065,540 B2 * | 6/2006 | Chandrasekaran et al. | .. 707/674 |
| 7,200,623 B2 * | 4/2007 | Chandrasekaran et al. | .......... 1/1 |
| 7,296,039 B2 * | 11/2007 | Chandrasekaran et al. | .. 711/119 |
| 7,577,690 B2 * | 8/2009 | Chandrasekaran et al. | .. 711/119 |
| 7,644,300 B1 | 1/2010 | Rao | |
| 7,930,278 B2 * | 4/2011 | Chandrasekaran et al. | .. 707/695 |
| 2004/0010663 A1 | 1/2004 | Prabhu | |
| 2005/0138283 A1 | 6/2005 | Garney | |
| 2005/0228942 A1 | 10/2005 | Nichols et al. | |
| 2005/0251625 A1 | 11/2005 | Nagae et al. | |
| 2006/0047925 A1 | 3/2006 | Perry | |
| 2010/0153638 A1 | 6/2010 | Yochai et al. | |

* cited by examiner

*Primary Examiner* — Stephen Elmore
(74) *Attorney, Agent, or Firm* — Oliff & Berridge, PLC (57) ABSTRACT

A mass storage system and method incorporates a cache memory or a cache management module which handles dirty data using an access-based promotion replacement process through consistency checkpoints. The consistency checkpoints are associated with a global number of snapshots generated in the storage system. The consistency checkpoints are organized within the sequence of dirty data in an invariable order corresponding to storage volumes with the generated snapshots, such that, responsive to destaging a consistency checkpoint the global number of generated snapshots are recorded and then read during recovery of the failed storage system.

20 Claims, 4 Drawing Sheets

MASS STORAGE SYSTEM AND METHOD OF OPERATING USING CONSISTENCY CHECKPOINTS AND DESTAGING

FIELD OF THE INVENTION

The present invention relates generally to mass data storage systems and, particularly, to data recovery after a failure.

BACKGROUND OF THE INVENTION

In view of the business significance of stored data, IT organizations face a challenge to provide data protection and data recovery with highest data integrity. Two primary techniques enabling data recovery are mirroring technology and snapshot technology. In the event of a system failure (e.g. hardware failure, corrupting event, etc.), data recovery allows an enterprise to recover data from a prior point in time and to consistently resume operations. The problems of identifying and implementing points in time when the stored data is known to be consistent have been recognized in the Prior Art and various systems have been developed to provide a solution as, for example:

U.S. Pat. No. 5,341,493 (Yanai et al.) discloses a disk storage system including means for assuring completion of data writes to a data storage disk upon failure of electrical power received data write commands including data to be written to one or more storage disks. Temporary memory storage temporarily stores the write commands including data to be written to one or more storage disks. The system generates a disk write pending indicator associated with each datum to be written to the one or more storage disks, for indicating that the data stored in the temporary memory must be written to disk. A disk director searches the temporary memory storage for data stored in the temporary memory storage that must be written to disk as indicated by the associated data write pending indicator, for writing the data to the one or more storage disks. Also included are means for providing electrical power to the one or more storage disks, the temporary memory storage and the disk director upon the failure of main electrical power, for assuring completion of write commands stored in the temporary memory storage to one or more storage disks upon the failure of main electrical power.

U.S. Pat. No. 7,644,300 (Rao) discloses a method for re-synchronizing a first copy of data on a first storage system from a second copy of the data on a second storage system, which includes, at a regular checkpoint interval, the first storage system pushing data in its cache that were modified prior to a checkpoint time to its nonvolatile storage and saving the checkpoint time to its nonvolatile storage. The method further includes, at a regular snapshot interval greater than the checkpoint interval, the second storage system taking snapshots of the second copy of the data. When the first storage system has an uncontrolled shutdown, the second storage system determines the snapshot closest in time to the last checkpoint time and sends the difference between the last snapshot and the second copy of the data to the first storage system to recover data lost during the uncontrolled shutdown.

US Patent Application No. 2004/010663 (Prabhu) discloses a method for conducting check-pointing within a write-back cache having a cache memory with at least two memory banks. In one embodiment, a first pointer is set to indicate which cache entry of the at least two memory banks contains current data. A second pointer is set to indicate which cache entry of the at least two memory banks contains checkpoint data. Check-pointing is performed by selectively controlling said second pointer or said first pointer.

US Patent Application No. 2005/138283 (Gamey) discloses a method comprising preserving the coherency of a disk cache within a system external to a disk drive by sequentially writing dirty cache lines comprising said disk cache to a sequential region on said disk drive upon indication of a shutdown of said system; and subsequently restoring the coherency of said disk cache by sequentially reading previously written dirty cache lines from said sequential region on said disk drive.

US Patent Application No. 2005/228942 (Nichols et al.) discloses a method for returning a logical volume which is part of a redundant data storage system to on-line status following a disk failure within the logical volume during the time when another of that volume's disks is unavailable as a result of having its firmware updated, as an example. Data, which would otherwise be changed in the logical volume due to host write requests, is directed to a logging facility within the data storage system, but outside of the logical volume undergoing upgrade.

US Patent Application No. 2005/251625 (Nagae et al.) discloses a data processing system which controls, from the database management system on a host computer, the storage device subsystem which stores log data supplied from the database management system; allocates on a disk cache in the storage device subsystem in advance a log-dedicated buffer area of a size equal to that of the log data output between checkpoints; writes log data into the buffer area; and, in the event of a host computer failure, reads out the log data from the disk cache without making access to a disk device. Since the log information required for the recovery of the data processing device is cached on the storage device side, the time it takes to read the necessary log information can be shortened, which in turn reduces the system recovery time.

US Patent Application No. 2006/047925 (Perry et al.) discloses a technology facilitating recovery from storage-related failures by check-pointing copy-on-write operation sequences. An operation sequence incorporating such checkpoints into a copy-on-write can include the following: receive a write request that identifies payload data to be written to a first data store, read original data associated with the first data store, copy the original data to a second data store, record transactional information associated with the write request, generate a first checkpoint to confirm the successful recordation of the transactional information and the successful copying of the original data to the second data store, write the payload data to the first data store, acknowledge a successful completion of the copy-on-write operation sequence, and generate a second checkpoint that confirms the successful completion of such operation sequence. The first and second checkpoints are used to form a pre-failure representation of one or more storage units (or parts thereof). The checkpoints can be stored with other transactional information, to facilitate recovery in the event of a failure, and can be used to facilitate the use of optimizations to process I/O operations.

U.S. Pat. No. 6,691,245 (Dekoning) discloses a mirrored data storage system utilizing a first host device and a local storage device for primary data storage and a second host device and a remote storage device for mirrored, fail-over storage on behalf of client devices. At periodic intervals (called checkpoints), the first host device initiates data synchronization between itself and the two storage devices and issues checkpoint information to ensure that each device maintains information for a common stable storage state. The local storage device synchronizes its stored data and forwards the checkpoint information to the remote storage device. The remote storage device maintains a copy (called a snapshot) of the data at the common stable storage state. Given the snapshot and the checkpoint information, the remote storage device can restore itself to the common stable storage state in the event of a failure of the first host device and/or the local storage device. Upon failure of the first host device and/or the local storage device, the second host device is instructed to initiate a switch, or fail-over, to serving as the primary data storage on behalf of the client devices.

SUMMARY OF THE INVENTION

In accordance with certain aspects of the subject matter of the present application, there is provided a method of operating a mass storage system comprising a storage layer operatively coupled to a plurality of disk drives constituting a storage space. The method comprises: a) generating one or more consistency checkpoints; b) associating each generated consistency checkpoint with a global number of snapshots generated in the storage system corresponding to time of generation of respective checkpoint; c) upon generating, placing each consistency checkpoint at the beginning of a sequence of dirty data portions which are handled in a cache memory with the help of a replacement technique with an access-based promotion; d) enabling within the sequence of dirty data portions an invariable order of consistency checkpoints and dirty data portions corresponding to volumes with generated snapshots; and e) responsive to destaging a certain consistency checkpoint, recording associated with the certain checkpoint global number of generated snapshots to a predefined storage location configured to be read during a recovery of the storage system. The invariable order can be provided by ceasing access-related promotion of all dirty data portions corresponding to all volumes with generated snapshots.

The method can further comprise receiving, responsive to an access request to a given dirty data portion, an indication if the given data portion corresponds to a volume associated with one or more snapshots and further labeling data portions corresponding to a volume associated with one or more snapshots, thereby indicating that respective data portion should not be promoted in response to one or more access requests.

The method may further comprise: a) upon returning the storage system online after an uncontrolled shutdown, receiving the lastly updated global number N of generated snapshots, the number associated with the last destaged consistency checkpoint; b) retrieving last snapshot corresponding to a certain volume need to be restored, the last snapshot is associated with a global number n of generated snapshots, wherein n<N; and c) restoring the respective volume with the help of the last snapshot.

In accordance with other aspects of the subject matter of the present application, there is provided a mass storage system comprising a storage layer operatively coupled to a plurality of disk drives constituting a storage space, the storage layer comprising a cache memory operable to handle dirty data portions with the help of a replacement technique with an access-based promotion and operatively coupled to a cache management module, and cache management module therein. The cache management module is operable to generate one or more consistency checkpoints; to associate each generated consistency checkpoint with the global number of snapshots generated in the storage system corresponding to time of generation of respective checkpoint; upon generating, to place each consistency checkpoint at the beginning of a sequence of dirty data portions handled in the cache memory; to enable within the sequence of dirty data portions an invariable order of consistency checkpoints and dirty data portions corresponding to volumes with generated snapshots; and, responsive to destaging a certain consistency checkpoint, to enable recording associated with the certain checkpoint, the global number of generated snapshots to a predefined storage location configured to be read during a recovery of the storage system.

The cache management module can be further operable to receive, responsive to an access request to a given dirty data portion, an indication if the given data portion corresponds to a volume associated with one or more snapshots and to label data portions corresponding to a volume associated with one or more snapshots, thereby indicating that respective data portion should not be promoted in response to one or more access requests.

The cache management module can be further operable, upon returning the storage system online after an uncontrolled shutdown, to receive the lastly updated global number N of generated snapshots, the number associated with the last destaged consistency checkpoint; to retrieve last snapshot corresponding to a certain volume need to be restored, the last snapshot is associated with a global number n of generated snapshots, wherein n<N; and to restore the respective volume with the help of the last snapshot.

Among advantages of certain embodiments of the present invention is eliminating the need for synchronization of snapshots, checkpoints and/or transactions for enabling consistent recovery. The checkpoints are provided in a global manner independently from any individual data portions and/or snapshots. The consistent recovery relies on exploiting existing cache functionalities and general resilience mechanisms already implemented in the storage system.

BRIEF DESCRIPTION OF THE DRAWINGS

In order to understand the invention and to see how it can be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the invention. However, it will be understood by those skilled in the art that the present invention can be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "modifying", "calculating", "identifying", "generating", "configuring", or the like, refer to the action and/or processes of a computer that manipulate and/or transform data into other data, said data represented as physical, such as electronic, quantities and/or said data represent one or more physical objects. The term "computer" should be expansively construed to cover any kind of electronic device with data processing capabilities, including, by way of non-limiting example, storage system and/or parts thereof disclosed in the present application.

The operations in accordance with the teachings herein can be performed by a computer specially constructed for the desired purposes or by a general purpose computer specially configured for the desired purpose by a computer program stored in a computer readable storage medium.

The references cited in the background teach many principles of reliable recovery of mass storage systems that are applicable to the present invention. Therefore the full contents of these publications are incorporated by reference herein where appropriate for appropriate teachings of additional or alternative details, features and/or technical background.

In the drawings and descriptions, identical reference numerals indicate those components that are common to different embodiments or configurations.

Figure 1:
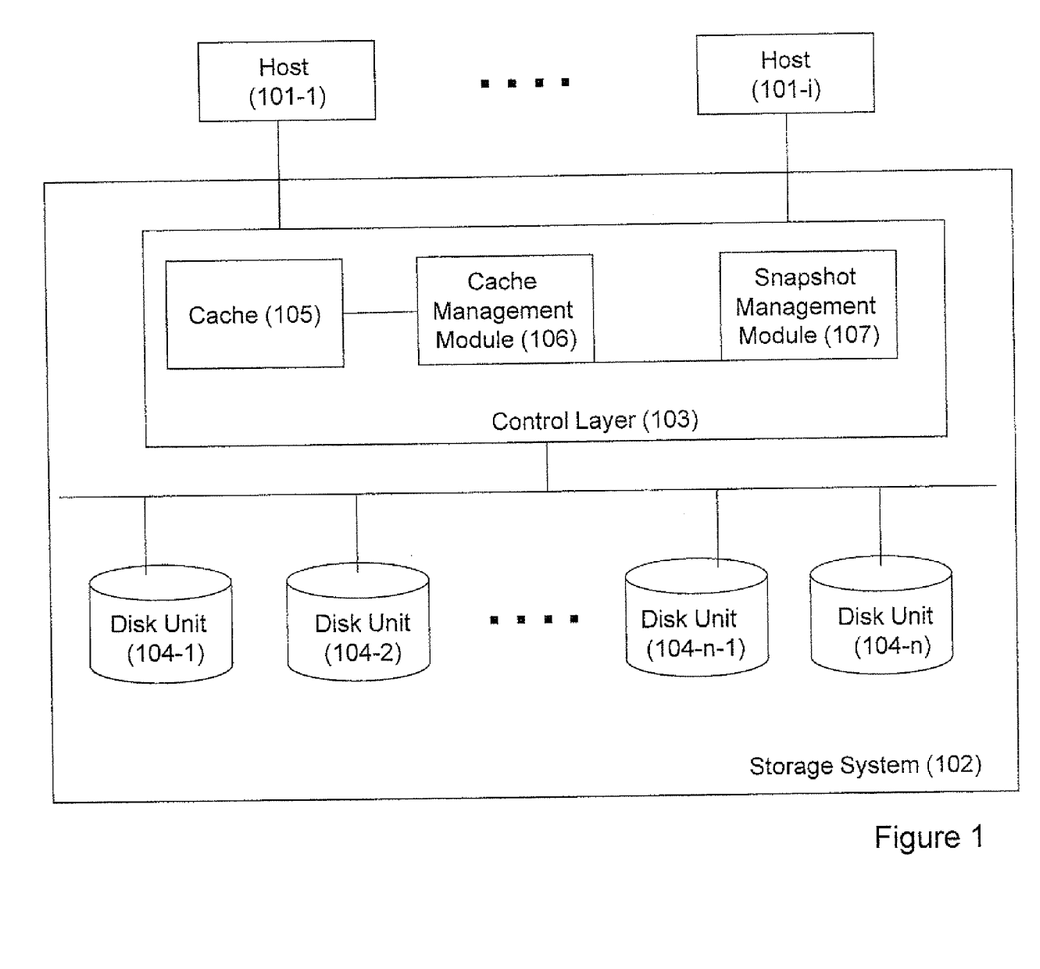
FIG. 1 illustrates a generalized functional block diagram of a mass storage system in accordance with certain embodiments of the present invention.

Bearing this in mind, attention is drawn to FIG. 1 illustrating a schematic functional diagram of a mass storage system in accordance with certain embodiments of the present invention.

The illustrated mass storage system 102 provides common storage means to be shared by a plurality of host computers (illustrated as 101-1-101-*i*). The storage system includes a control layer 103 comprising a plurality of appropriate storage control devices, operatively coupled to the plurality of host computers and operable to control I/O operations between the plurality of host computers and a plurality of data storage devices. The data storage devices constitute a physical storage space optionally distributed over one or more storage nodes, wherein the storage control layer is operable to control interface operations (including I/O operations) between the host computers and the storage physical space. The storage system can be configured in a manner enabling direct or indirect serving a request directed at any available address in the physical storage space.

Optionally, the storage control layer can be further operable to handle a virtual representation of physical storage space, and to facilitate necessary mapping between the physical storage space and its virtual representation. The virtualization functions can be provided in hardware, software, firmware or any suitable combination thereof. Optionally, the functions of the control layer can be fully or partly integrated with one or more host computers and/or storage devices and/or with one or more communication devices enabling communication between the hosts and the storage devices. The storage control layer and the storage devices can communicate with the host computers and within the storage system in accordance with any appropriate storage protocol.

The physical storage space can comprise any appropriate nonvolatile storage medium and include, by way of non-limiting example, a plurality of physical disk drives (PD) organized in one or more arrays (illustrated as disk units 104-1-104-*n*).

When receiving a write request from a host, the storage control layer 103 defines a physical location(s) designated for writing the respective data (e.g. in accordance with an allocation scheme and/or preconfigured rules and policies stored in the allocation module or otherwise). Similarly, when receiving a read request from the host, the storage control layer defines the physical location(s) of the desired data portion(s) and further processes the request accordingly. The storage control layer further issues updates of a given data object to all storage nodes which physically store data related to the data object. The storage control layer is further operable to redirect the request/update to storage device(s) with appropriate storage location(s) irrespective of the specific storage control device receiving I/O request.

The storage control layer comprises a snapshot management module 106 configured to obtain a current global number of snapshots generated in the storage system. A typical storage system comprises a local counter of snapshots generated per given volumes. The storage system is configured to handle a volume table comprising data related to all volumes in the system (e.g. size, name, etc), and, responsive to the local counter, to update the local snapshot numbers (i.e. numbers of snapshots with respect to corresponding volumes) in the respective fields of the table. A typical storage system further comprises a global counter of snapshots generated in the system, and the counter is updated responsive to generating in the storage system a snapshot for whatever volume. The snapshot management module 106 is configured to receive a current global number of snapshots from the global counter and/or to retrieve this number from a respective storage location. The snapshot management module can be further configured to obtain an association between a given global number of snapshots and corresponding local snapshot number and respective volume. Optionally, if a certain storage system does not provide global snapshot counting and/or association between global and local snapshot numbers, the snapshot management module can be configured to provide these functionalities.

The storage control layer 103 further comprises a volatile cache memory 105 for temporarily storing the data to be written to the storage devices in response to a write command and/or for temporarily storing the data to be read from the storage devices in response to a read command. In accordance with certain embodiments of the present invention, the control layer further comprises a cache management module 106 operatively connected to the cache memory and to the snapshot management module and operable to facilitate operations further detailed with reference to FIGS. 2-4. The cache memory and the cache management module can be implemented as centralized modules operatively connected to the plurality of storage control devices or can be, at least partly, distributed over some or all storage control devices.

During the write operation the data is temporarily retained until subsequently written to one or more data storage devices. Such temporarily retained data is referred to hereinafter as "write-pending" data or "dirty data". Once the write-pending data is sent to the respective nonvolatile storage medium, its status is changed from "write-pending" to "non-write-pending", and the storage system relates to this data as stored at the nonvolatile storage medium and allowed to be erased from the cache memory. Such data is referred to hereinafter as "clean data".

The control layer notifies the host computer of the completion of the write operation when the respective data has been written to the cache memory. The write request is acknowledged prior to the write-pending data being stored in the nonvolatile storage medium. However, "dirty" data in the volatile cache memory may be lost when power supply to the cache memory is interrupted. As will be further detailed with reference to FIG. 2, known in the art mechanisms for destaging data from the cache memory to the nonvolatile storage are generally not time-aware. This implies that the cache memory could have frequently accessed dirty data that were modified long ago but not destaged to the nonvolatile storage. Accordingly, in a case of uncontrolled shutdown, further recovering from a last-made snapshot may lead to data inconsistency. By way of non-limiting example, if there is a read-only snapshot $V_{0,1}$ taken at time $T_1$ as a virtual copy of a volume $V_0$, certain modified-after-snapshot data portions corresponding to the volume $V_0$ can be handled in the cache as dirty data at a time Tc of uncontrolled shutdown, Tc>$T_1$. Restoring the system to a working condition may require reading from the stored data corresponding to all volumes. However, as certain modified-after-snapshot data portions of $V_0$ were in cache memory at shutdown time Tc as dirty data, the data stored in the disks is not consistent with last data acknowledged as written to $V_0$. Therefore, restoring the volume $V_0$ using the data in the snapshot may create an inconsistent data situation, since such restoring may include combining data belonging to different data images. In such an inconsistency situation, some restores may be successful, but, occasionally, the storage system may be unable to recover some restored data.

In accordance with certain embodiments of the present invention, there is provided a technique ensuring that all data portions corresponding to a snapshot $V_{0,j}$ generated at time $T_c$>$T_i$ have been destaged to a nonvolatile storage medium. Such an approach guarantees a consistent situation when restoring from the snapshot $V_{0,j}$, although in some cases may ignore some new data that was written to $V_0$ after $T_i$.

Figure 2:
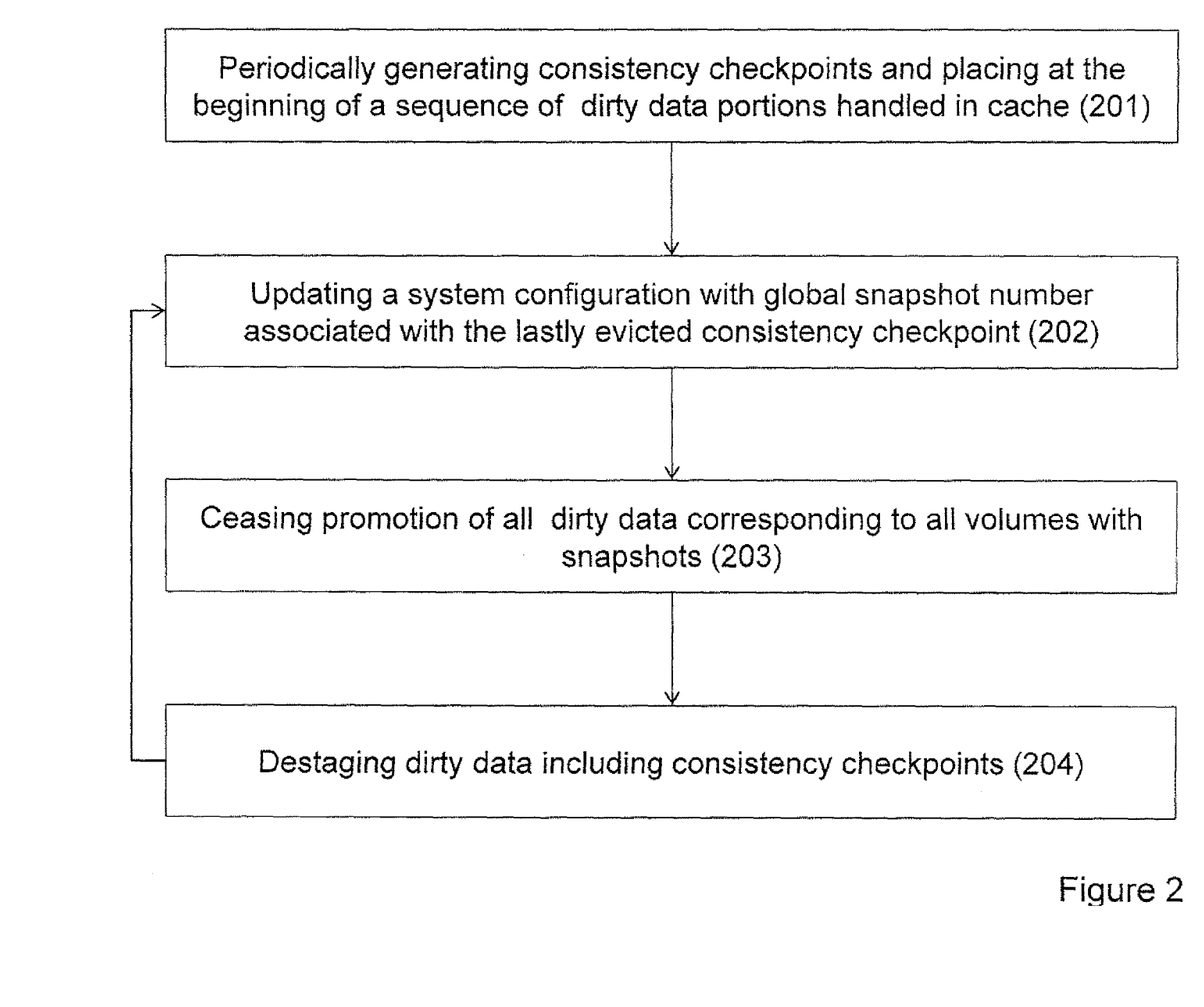
FIG. 2 illustrates a generalized flow diagram of managing dirty data in accordance with certain embodiments of the present invention.

Referring to FIG. 2, there is schematically illustrated a generalized flow diagram of managing dirty data in accordance with certain embodiments of the present invention.

The cache management module 106 is configured to manage the process of handling dirty data in the cache memory 105. The management can be provided with the help of usage-based replacing technique (also referred to hereinafter as replacement technique with access-based promotion) as, by way of non-limiting example, known in the art LRU (Least Recently Used) technique, LFU (Least Frequently Used) technique, MFU (Most Frequently Used) technique, weighted-LRU techniques, pseudo-LRU techniques, etc. Usage-based replacing techniques enable destaging the data portions from the cache memory in accordance with certain usage-related criteria.

For purpose of illustration only, the following description is provided for LRU technique with separate handling of dirty data. Those skilled in the art will readily appreciate that the teachings of the present invention are applicable in a similar manner to any other usage-based replacing techniques.

As the name implies, LRU technique enables destaging (e.g. whenever new cache space is required) dirty data portions that were used least recently. Data portions managed in accordance with LRU technique can be presented as a linked list with one of the members indicated by an external pointer as the least recently used element of the list. Such an element is considered as located at the bottom of the list, and respective data portion is the first to be destaged from the list. In a case of separate LRU lists for clean and dirty data, destaging a data portion from the dirty data LRU list means that the data portion is destaged (hence it ceases to be dirty), and it can be moved to a separate clean data LRU list or be evicted from the entire cache. Upon destaging the data portion from the dirty data LRU list, the pointer is then moved to point to the element that was next to the bottom of the list; this element turns now into the least recently used element. Whenever a new data portion is added to the cache, it is placed at the top of the linked list, and, as the pointer advances with time, this new data portion can eventually become the least recently used and hence be destaged. The LRU technique further includes an access-based promotion mechanism: an element of the linked list accessed while being in the cache is moved back towards the top of the list. The access-based promotion mechanism can be implemented in any suitable way, some of them known in the art.

In accordance with certain embodiments of the present invention, the cache management module is further configured to periodically (e.g. each 10 seconds) generate (201) a "consistency checkpoint" and to add the generated checkpoint at the top of the dirty data LRU list. This consistency checkpoint can be, for example, a recognizable kind of data portion identifiable by a certain flag in its header. Each generated checkpoint is handled in the LRU as any other element of the LRU list, which means that eventually it will reach the bottom and will be destaged (obviously, the consistency checkpoints are not promoted).

The time periods between the generated checkpoints may be equal, arbitrary within a certain predefined range, dynamically configurable (e.g. depending on the rate of cache accesses, rate of snapshot generation, etc.) or otherwise defined.

The cache management module is further configured to receive a current global number of generated snapshots (e.g. from the snapshot management module) and to associate each generated consistency checkpoint with the corresponding current global number of generated snapshots. By way of non-limiting example, the association can be provided by writing the respective current global number of generated snapshots in the header and/or the body of each generated consistency checkpoint.

Optionally, the consistency checkpoints can have a data structure identical in size and number of fields to the structure of regular data portions handled in the LRU, wherein the header of consistency checkpoints can comprise a special indicating flag. The cache management module can be configured to check the header of each data portion (e.g., before evicting it from the LRU), and, responsive to recognizing a consistency checkpoint, to handle the content of one or more predefined fields in a manner pre-configured for consistency checkpoints. By way of non-limiting example, the cache management module can be configured to recognize the global number of generated snapshots even if it is written in a field used in the regular data portions for other purposes.

The cache management module is further configured to record global snapshot number associated with the destaged checkpoint to a predefined storage location configured to be read during a recovery of the storage system. By way of non-limiting example, the above data can be recorded to a system configuration file and be handled together with other system configuration metadata, wherein the storage system shall comprise a resilience mechanism allowing successful storage of the system configuration file in a case of a shutdown. Non-limiting example of such resilience mechanism is disclosed in U.S. application Ser. No. 12/704,317 filed Feb. 11, 2010 and assigned to the assignee of the present application. Accordingly, the storage system (e.g. system configuration file) is constantly updated (202) with the global snapshot number associated with the lastly destaged checkpoint.

The cache management module is further configured, responsive to an access request to a given dirty data portion, to receive an indication if this given data portion corresponds to a volume associated with one or more snapshots. Such indication can be received from the snapshot management module, from the system configuration file or with the help of any other appropriate technique, some of them known in the art. In accordance with certain embodiments of the present invention, if the data portion addressed in the access request corresponds to a volume associated with one or more snapshots, such a data portion will not be promoted in LRU list responsive to the access request. Accordingly, the cache management module enables ceasing (203) access-based promotion of dirty data portions corresponding to volumes with snapshot(s) (referred to hereinafter as "snapshot-related data"). Snapshot-related data are left in place until destaged, while modifications of these data portions are provided if requested. Likewise, the cache management module enables ceasing (203) access-based promotion of snapshot-related data in a case of any other suitable usage-based replacement technique.

Optionally, the cache management module can label the snapshot-related data (e.g. by introducing special flags in the header of respective data portions) indicating that a respective data portion should not be promoted.

As a result of ceased access-based promotion, all dirty data portions related to a snapshot $V_{ik}$ of volume $V_i$ are located in the LRU list closer to the bottom than a consistency checkpoint generated at point-in-time $T_2 \geq T_k$, where $T_k$ is time of generating a snapshot $V_{ik}$ of volume $V_i$.

Accordingly, all dirty data related to the snapshot $V_{ik}$ will be destaged before destaging this consistency checkpoint generated at point-in-time $T_2 \geq T_k$. Likewise, in a case of snapshots of several volumes, all dirty data portions related to a snapshot with global number N are located in the LRU list closer to the bottom than a consistency checkpoint generated at point-in-time $T_2 \geq T_n$, where $T_n$ is time of generating a snapshot with global number N. Accordingly, all dirty data related to the snapshot with global number N will be destaged before destaging this consistency checkpoint generated at point-in-time $T_2 \geq T_n$.

Figure 3A:
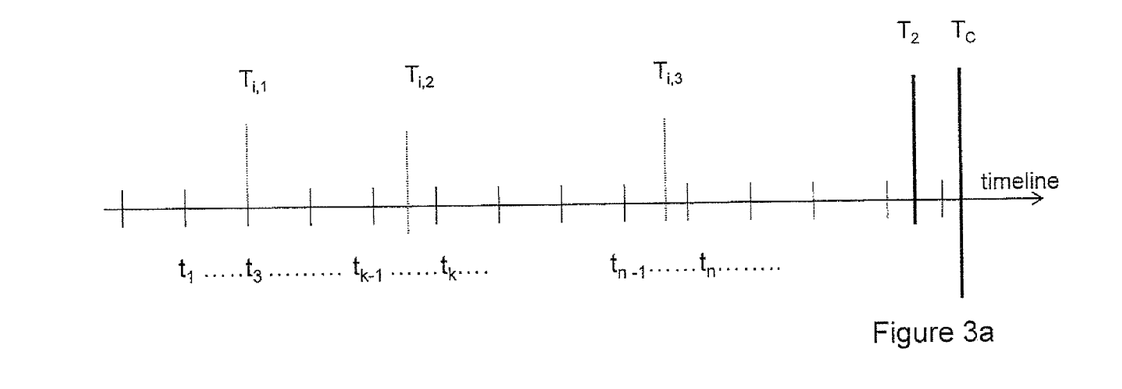
FIGS. 3a and 3b schematically illustrate an exemplary sequence of dirty data portions corresponding to different snapshots and consistency checkpoints in accordance with certain embodiments of the present invention.
Figure 3B:
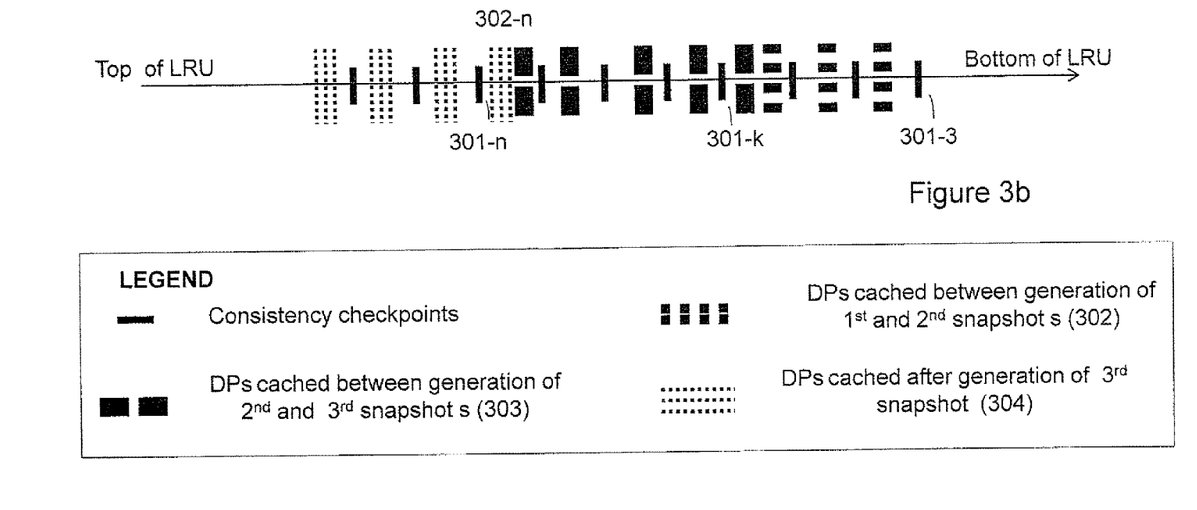

The non-limiting simplified example of a sequence of consistency checkpoints and dirty data portions corresponding to different snapshots is further illustrated with reference to FIGS. 3a and 3b. FIG. 3a illustrates an exemplary timeline with consistency checkpoints periodically generated at different points-in-time (some of them are depicted as $t_1$, $t_3$, $t_{k-1}$ $t_k$, $t_{n-1}$, $t_n$). Snapshot $V_{i1}$ of volume $V_i$ is generated at time $T_{i1}=t_3$, with global number N−2; snapshot $V_{i2}$ of volume $V_1$ is generated at time $t_{k-1}<T_{i2}<t_k$, with global number N−1; and snapshot $V_{i3}$ of volume $V_i$ is generated at time $t_{n-1}<T_{i3}<t_n$, with global number N; points-in-time $T_{i1}$, $T_{i2}$, and $T_{i3}$ are depicted by dashed lines. $T_c$ is the time of uncontrolled shutdown, and $T_2$ is destage time of the lastly destaged checkpoint before the shutdown, points-in-time $T_2$ and $T_c$ are depicted by bold lines. FIG. 3b illustrates an exemplary sequence of data portions in LRU in correspondence with the timeline illustrated in FIG. 3a. For purpose of illustration only, all dirty data in the illustrated LRU list are related to the same volume. Consistency checkpoints depicted in FIG. 3b as 301-3, 301-k and 301-n have been generated at points-in-time depicted as $t_3$, $t_k$, $t_n$ in FIG. 3a. Checkpoint 301-3 and following checkpoints before 301-k are associated with global number (N−2) of generated snapshots, checkpoint 301-k and following checkpoints before 301-n are associated with global number (N−1) and checkpoint 301-n and following checkpoints are associated with global number N. For purpose of illustration, checkpoint 301-n generated at time $t_n$ is the last checkpoint destaged at time $T_2$ before shutdown. Dirty data portions 302 have been first written to cache between generating snapshot $V_{i1}$ and snapshot $V_{i2}$. (the data can be modified after generating respective snapshots). Dirty data portions 303 have been first written to cache between generating snapshot $V_{i2}$ and snapshot $V_{i3}$. Dirty data portions 304 have been first written to cache after generating snapshot $V_{i3}$. As the illustrated data portions are related to a volume with generated snapshots, they are ceased from access-based promotion and the sequence of the data portions and consistency checkpoints will not be altered before destaging. Accordingly, all data portions first written to cache before generating the snapshot with global number N will be successfully destaged before checkpoint 301-n, which is the last consistency checkpoint destaged before the uncontrolled shutdown and associated with global number N. In the illustrated example, the successfully destaged data correspond to the snapshot $V_{i3}$.

Referring back to FIG. 2, eventually, snapshot-related dirty data reach the bottom of the LRU list and are destaged (204) as well as the respective consistency checkpoints. The cache management module continues to update (202) the system configuration file with global snapshot number associated with each next destaged checkpoint.

Figure 4:
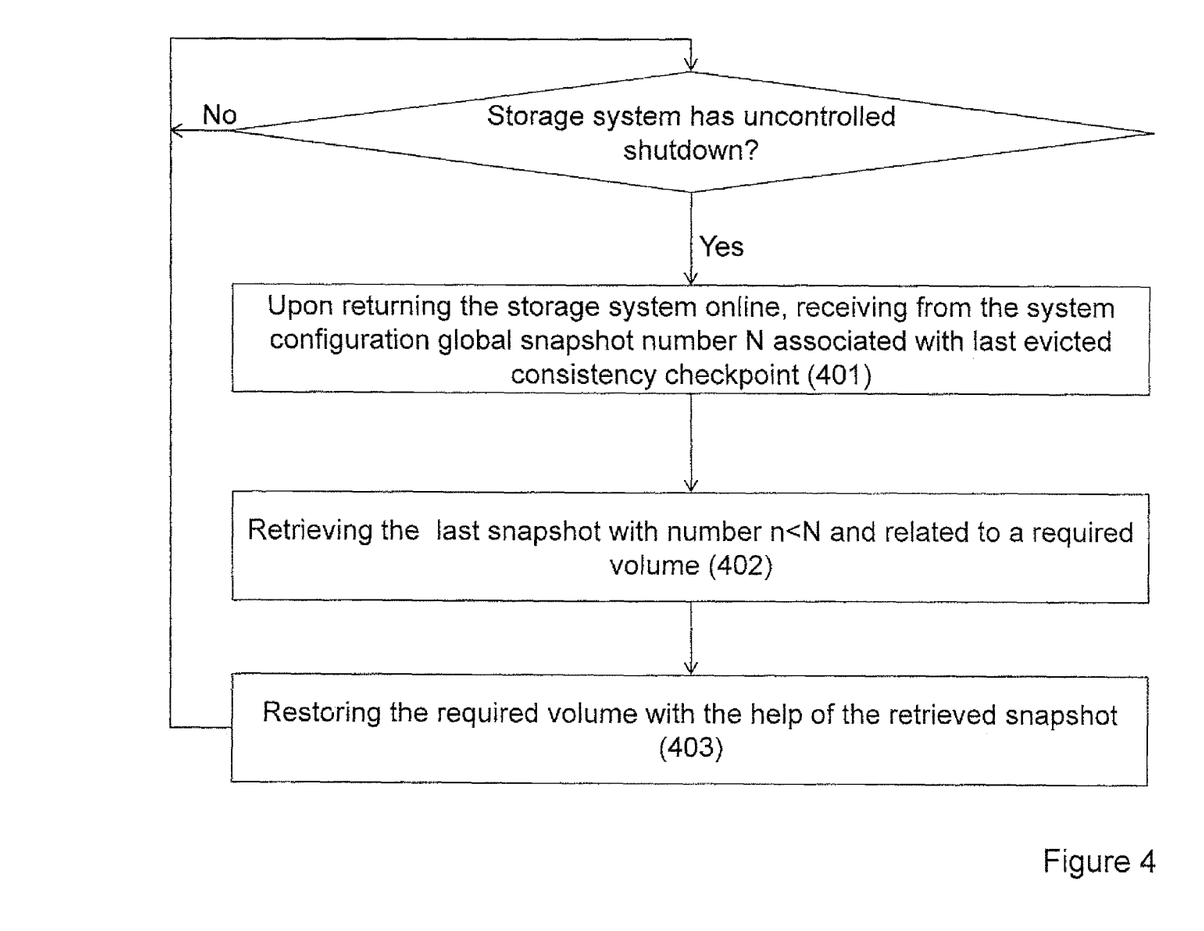
FIG. 4 illustrates a generalized flow diagram of recovering from a snapshot in accordance with certain embodiments of the present invention.

Referring now to FIG. 4, there is schematically illustrated a generalized flow-chart of recovering from a snapshot in accordance with certain embodiments of the present invention.

Upon returning the storage system online after an uncontrolled shutdown occurred at time $T_c$, a recovery process restores metadata comprised in the system configuration and receives (401) therefrom the lastly updated global snapshot number N associated with the last destaged consistency checkpoint. In order to recover a certain volume, the storage system (automatically or per user's request) retrieves (402) the last snapshot corresponding to this certain volume and having global number n<N, and restores (403) the respective volume accordingly. Correspondence between global numbers of generated snapshots and respective volumes with local snapshot numbers can be retrieved from the volume table, received from the snapshot management module or with the help of any other appropriate technique, some of them known in the art.

Those versed in the art will readily appreciate that if the cache memory comprises multiple cache memory blocks with separate replacement mechanisms, then the processes described with reference to FIGS. 2-4 are implemented in each cache memory block, and the system configuration is updated with a global snapshot number associated with the last destaged checkpoint throughout the processes, regardless of the distribution of the destaging process over the cache memory blocks.

Those versed in the art will readily appreciate that the subject matter of the present application is not bound by the specific architecture, equivalent and/or modified functionality can be consolidated or divided in another manner and can be implemented in any appropriate combination of software, firmware and hardware, and, likewise, is applicable to any mass storage architecture implementing cache-based writing operations. In different embodiments of the invention the functional blocks and/or parts thereof can be placed in a single or in multiple geographical locations (including duplication for high-availability); operative connections between the blocks and/or within the blocks can be implemented directly (e.g. via a bus) or indirectly, including remote connection. The remote connection can be provided via Wireline, Wireless, cable, Internet, Intranet, power, satellite or other networks and/or using any appropriate communication standard, system and/or protocol and variants or evolution thereof (as, by way of non-limited example, Ethernet, iSCSI, Fiber Channel, etc.).

It will be appreciated that the embodiments described above are cited by way of example, and various features thereof and combinations of these features can be varied and modified.

The invention claimed is:

1. A method of operating a mass storage system comprising a storage layer operatively coupled to a plurality of disk drives constituting a storage space, the method comprising:

a. generating one or more consistency checkpoints;
b. associating each generated consistency checkpoint with a global number of snapshots generated in the storage system corresponding to time of generation of respective checkpoint;
c. upon generating, placing each consistency checkpoint at the beginning of a sequence of dirty data portions which are handled in a cache memory with the help of a replacement technique with an access-based promotion;
d. enabling within the sequence of dirty data portions an invariable order of consistency checkpoints and dirty data portions corresponding to volumes with generated snapshots; and
e. responsive to destaging a certain consistency checkpoint, recording associated with said certain checkpoint global number of generated snapshots to a predefined storage location configured to be read during a recovery of the storage system.

2. The method of claim 1 wherein said invariable order is provided by ceasing access-related promotion of all dirty data portions corresponding to all volumes with generated snapshots.

3. The method of claim 2 further comprising receiving, responsive to an access request to a given dirty data portion, an indication if said given data portion corresponds to a volume associated with one or more snapshots.

4. The method of claim 3 further comprising labeling data portions corresponding to a volume associated with one or more snapshots, thereby indicating that respective data portion should not be promoted in response to one or more access requests.

5. The method of claim 1 further comprising:
a. upon returning the storage system online after an uncontrolled shutdown, receiving the lastly updated global number N of generated snapshots, said number associated with the last destaged consistency checkpoint;
b. retrieving last snapshot corresponding to a certain volume need to be restored, said last snapshot is associated with a global number n of generated snapshots, wherein $n < N$; and
c. restoring the respective volume with the help of said last snapshot.

6. The method of claim 1 wherein the consistency checkpoints are generated as data portions identifiable by a certain flag in its header.

7. The method of claim 1 wherein time periods between the generated checkpoints are selected from a group comprising equal time periods, an arbitrary time period selected within a certain predefined range, and dynamically configurable time periods.

8. The method of claim 1 wherein the association between a certain consistency checkpoint and corresponding global number of generated snapshots is provided by writing the respective global number of generated snapshots in the header and/or the body of said certain consistency checkpoint.

9. A computer program comprising computer program code means for performing all the steps of claim 1 when said program is run on a computer.

10. A computer program as claimed in claim 9 embodied on a computer readable medium.

11. A mass storage system comprising a storage layer operatively coupled to a plurality of disk drives constituting a storage space, said storage layer comprising a cache memory operable to handle dirty data portions with the help of a replacement technique with an access-based promotion and operatively coupled to a cache management module, wherein the cache management module is operable:
a. to generate one or more consistency checkpoints;
b. to associate each generated consistency checkpoint with a global number of snapshots generated in the storage system corresponding to time of generation of respective checkpoint;
c. upon generating, to place each consistency checkpoint at the beginning of a sequence of dirty data portions handled in the cache memory;
d. to enable within the sequence of dirty data portions an invariable order of consistency checkpoints and dirty data portions corresponding to volumes with generated snapshots; and
e. responsive to destaging a certain consistency checkpoint, to enable recording associated with said certain checkpoint, the global number of generated snapshots to a predefined storage location configured to be read during a recovery of the storage system.

12. The system of claim 11 wherein said invariable order is provided by ceasing access-related promotion of all dirty data portions corresponding to all volumes with generated snapshots.

13. The system of claim 12 wherein the cache management module is further operable to receive, responsive to an access request to a given dirty data portion, an indication if said given data portion corresponds to a volume associated with one or more snapshots.

14. The system of claim 13 wherein the cache management module is further operable to label data portions corresponding to a volume associated with one or more snapshots, thereby indicating that respective data portion should not be promoted in response to one or more access requests.

15. The system of claim 13 wherein the cache management module is further operable:
a. upon returning the storage system online after an uncontrolled shutdown, to receive the lastly updated global number N of generated snapshots, said number associated with the last destaged consistency checkpoint;
b. to retrieve last snapshot corresponding to a certain volume need to be restored, said last snapshot is associated with a global number n of generated snapshots, wherein $n < N$; and
c. to restore the respective volume with the help of said last snapshot.

16. The system of claim 11 wherein the consistency checkpoints are generated as data portions identifiable by a certain flag in its header.

17. The system of claim 11 wherein time periods between the generated checkpoints are selected from a group comprising equal time periods, an arbitrary time period selected within a certain predefined range, and dynamically configurable time periods.

18. The system of claim 11 wherein the association between a certain consistency checkpoint and corresponding global number of generated snapshots is provided by writing the respective global number of generated snapshots in the header and/or the body of said certain consistency checkpoint.

19. A cache management module operable in conjunction with a mass storage system comprising a cache memory operable to handle dirty data portions with the help of a replacement technique with an access-based promotion and operatively coupled to the cache management module, the cache management module is operable:

a. to generate one or more consistency checkpoints;
b. to associate each generated consistency checkpoint with a global number of snapshots generated in the storage system corresponding to time of generation of respective checkpoint;
c. upon generating, to place each consistency checkpoint at the beginning of a sequence of dirty data portions handled in the cache memory;
d. to enable within the sequence of dirty data portions an invariable order of consistency checkpoints and dirty data portions corresponding to volumes with generated snapshots; and
e. responsive to destaging a certain consistency checkpoint, to enable recording associated with said certain checkpoint, global number of generated snapshots to a predefined storage location configured to be read during a recovery of the storage system.

20. The cache management module of claim 19 wherein said invariable order is provided by ceasing access-related promotion of all dirty data portions corresponding to all volumes with generated snapshots.

* * * * *